Sept. 5, 1950          T. J. KEARNEY          2,521,225
APPARATUS FOR SHOWING TABLE ACCOMMODATIONS
IN RESTAURANTS
Filed Sept. 5, 1947
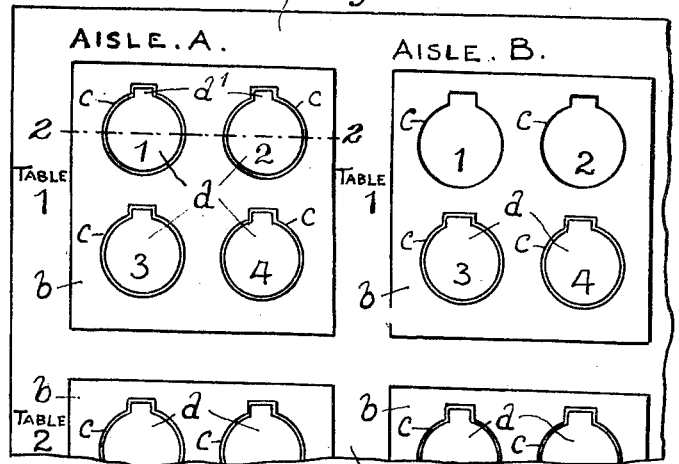
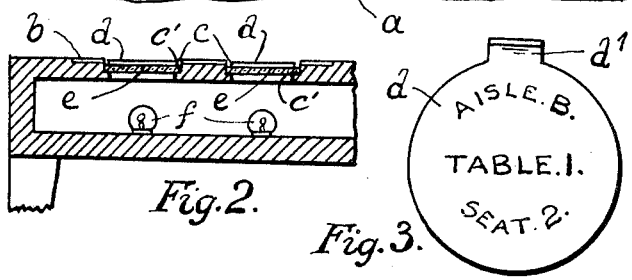
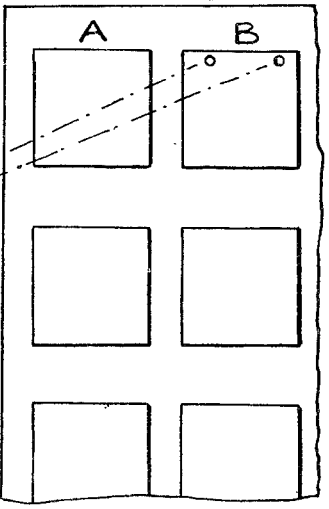
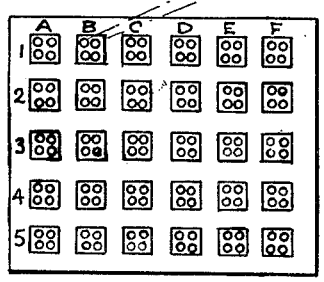
Inventor
Thomas J. Kearney
By
Attorney

UNITED STATES PATENT OFFICE 2,521,225

APPARATUS FOR SHOWING TABLE ACCOMMODATIONS IN RESTAURANTS

Thomas John Kearney, Dublin, Eire

Application September 5, 1947, Serial No. 772,383
In Eire February 4, 1947

2 Claims. (Cl. 116—130)

This invention relates to apparatus for showing table accommodation in restaurants, its object being to provide an efficient table check control which will prevent fraud, prevent unnecessary waiting, ensure easy running and speeding up of table service by indicating the positions of accommodation occupied and vacant at any or all of the restaurant tables.

According to the invention the apparatus for showing table accommodation in a restaurant comprises an illuminated control table the top of which is charted to show table accommodation, each table of the restaurant, or on any floor of a restaurant, being indicated on the control table by a circular or square or other shaped indication, so that each will indicate a table at a particular position on the restaurant floor, each table indication being subdivided into seating accommodation thereat, each subdivision being lettered and/or numbered and provided, at said subdivisions, with transparent apertures, illuminated from below, corresponding to the number of seats at the table and each shaped and adapted to removably receive a marked disc, or tally, having thereon a corresponding letter and/or number to indicate the aisle, table and seat number. These discs are issued from the control table by the restaurant controller to persons requiring accommodation at the tables and the diner surrenders the disc with the bill to the cashier who immediately returns same to the controller to be replaced in the appropriate position on the control table. The absence of a disc from its position on the control table indicates that a table seat is occupied, such occupied seats being clearly shown by the illumination thereof from below shown by a transparency, for example coloured glass.

The invention will now be described by way of example, with reference to the accompanying drawings wherein:

Fig. 1 shows in plan view, a portion of a control table in accordance with the invention.

Fig. 2 shows, in sectional elevation on the line 2—2, a portion of the control table.

Fig. 3 is an enlarged view of one of the discs.

Fig. 4 is a diagrammatic view showing, in plan, a complete control table and a portion of a restaurant floor and tables thereon.

Referring to the drawings:

In Fig. 1 the portion $I$ of the control table $a$ shows square indicators $b$ for four tables, each indicator square $b$ has four apertures $c$ therein and, as shown, each aperture $c$, with the exception of the apertures indicating table positions $I$ and $2$ at table $I$ of aisle B, are covered by the removable discs $d$. Below the discs $d$ in the apertures $c$, in each case, is a piece of coloured glass $e$ and suitably located and supported below same, for example within a hollow table top as shown at Fig. 2, are electric lamps $f$ so that when a disc $d$ is removed from an aperture $c$ the light will show through the glass $e$ to indicate the absence of the disc so that the table controller can see at a glance which table seats are occupied and which are vacant. This will be clearly seen on the diagram Fig. 4 where, as in Fig. 1 only table seats $I$ and $2$ at table $I$ of aisle B are shown occupied.

The apertures $c$ are each shown in Fig. 2 recessed at $c'$ to provide a seat for the piece of glass $e$ which rests on the seat. Removable disks $d$ rest on top of the pieces of glass $e$ and, as shown in Fig. 3, have conveniently raised tabs $d^1$ wherein by they can easily be lifted from the recesses when required. The discs $d$ are issued from the control table $a$ by the restaurant table controller and are surrendered to the cashier when presenting the bill for payment. The cashier passes the surrendered disc to the table controller who replaces it on its appropriate aperture $c$. The table control arrangement as described will prevent fraud as a person cannot leave the restaurant without presenting both the disc and appropriate bill to the cashier. As an example, a person cannot, as at present, occupy one seat and be served with a full course dinner and then after receiving the bill occupy another seat to be served with say a cup of coffee and, when leaving present the bill for coffee to the cashier. The invention also ensures easy running and speeding up of table service, prevents unnecessary waiting and indicates at a glance the positions of accommodation vacant.

I claim:

1. An indicating table for use in a restaurant, said table comprising, in combination, a table top, a plurality of squares representing tables in the restaurant and positioned on said table top to represent their relative positions in the restaurant, a plurality of apertures formed in said table top within each square and corresponding to the number of chairs at each table, a housing beneath said table top, a plurality of lamps within said housing to illuminate said apertures, circular seats formed in said apertures, an indent opening into each seat and extending beyond the periphery thereof, a light transmitting window mounted on each of said seats and covering each aperture to soften the light rays passing therethrough, a plurality of opaque discs corresponding in number to said apertures and for selective positioning on the top of the windows resting on said seats to respectively cover said windowed apertures and intercept the light passing therethrough, a tongue extending radially from each of said discs to fit in the indent of the respective seat for the disc, and prevent rotation of the disc, the ends of said tongues being bent upwardly to provide finger grips for removing said discs from their positions above the windows resting on said seats, and indicia on said discs indicating the chair and table that each disc represents.

2. An indicating device for restaurants to physically indicate the seating arrangement and condition thereof in the restaurant comprising a housing having a wall, the outer face of said wall being provided with a plurality of separate spaces representing tables in the restaurant and being formed on the face in accordance with the relative positions of the tables in the restaurant, each of said spaces being formed with a plurality of openings corresponding to the number of chairs at each table, a plurality of lamps mounted below the wall in the housing to illuminate the openings, seats formed in each of the openings, transparent panels seated on said seats and covering the openings, said panels being seated below the surface of the outer face of the wall, and opaque discs having indicia inscribed on their viewing sides to indicate the chair and table that each disc represents, said discs being removably seated on the panels to close off the openings and intercept the light passing therethrough.

THOMAS JOHN KEARNEY.

REFERENCES CITED

The following references are of record in the file of this patent:

UNITED STATES PATENTS

| Number | Name | Date |
|---|---|---|
| 996,521 | Pile | June 27, 1911 |
| 1,340,145 | Blair et al. | May 18, 1920 |
| 1,514,489 | Whippey | Nov. 4, 1924 |
| 1,719,518 | Nissen et al. | June 2, 1929 |

FOREIGN PATENTS

| Number | Country | Date |
|---|---|---|
| 132,720 | Great Britain | Sept. 25, 1919 |